UNITED STATES PATENT OFFICE

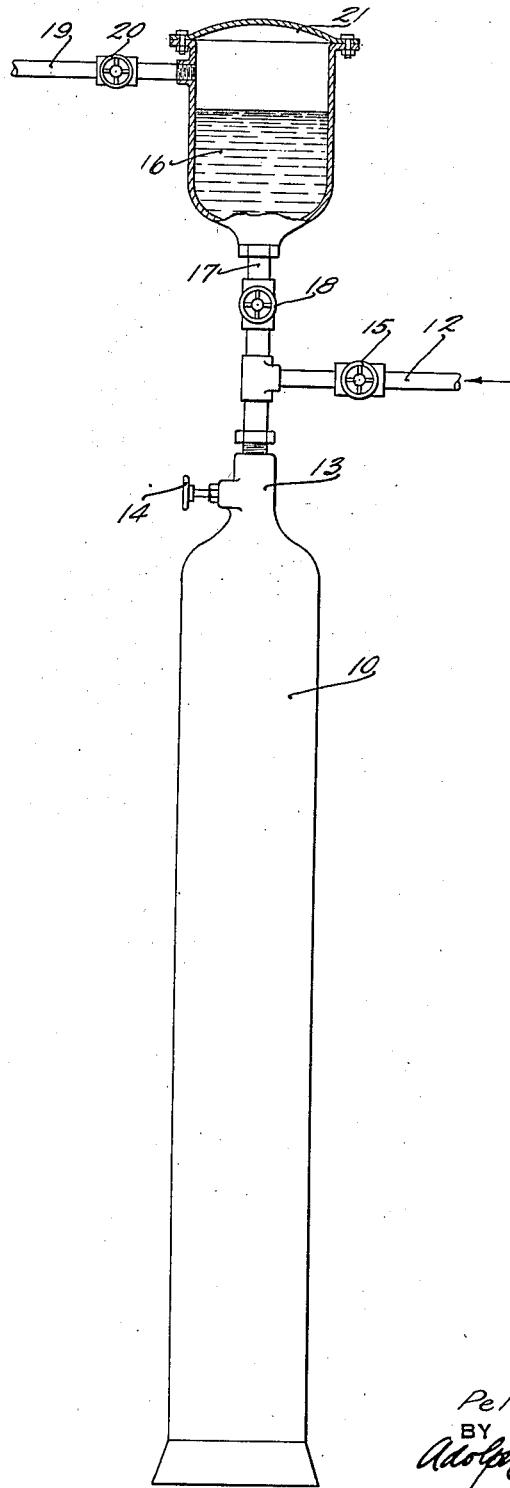

PETER SCHLUMBOHM, OF BERLIN, GERMANY, ASSIGNOR TO THE AMERICAN THERMOS BOTTLE COMPANY, OF NORWICH, CONNECTICUT, A CORPORATION OF OHIO

MANUFACTURE OF CARBON DIOXIDE ICE

Application filed June 12, 1931. Serial No. 543,896.

This invention comprises means for and methods of artificially coloring solid carbon dioxide or carbon dioxide ice, which is naturally white. For certain purposes in trade, it is desirable to have carbon dioxide ice with a distinctive color, like red, blue or green. For example, a dealer in carbon dioxide ice is supplied by the manufacturer with an extra amount of that product free in order that he (the dealer) may keep the bought carbon dioxide ice in storage. If this free carbon dioxide ice is colored, it can not be sold by the dealer in place of white carbon dioxide ice, which has to be of highest purity and is more expensive than the colored product. This is merely one of several uses of colored carbon dioxide ice, and is mentioned as an example not as a restriction of this invention.

There are several ways of imparting artificial coloring to solid carbon dioxide, and the figure in the drawing shows diagrammatically a form of apparatus suitable for this purpose. A tank or cylinder 10 is connected to a source of liquid carbon dioxide through a pipe 12 for storing the substance in the tank under pressure. The tank 10 has a nipple 13 provided with a valve 14, and a valve 15 may also be placed in supply pipe 12. A receptacle 16 communicates with tank 10 through a pipe 17 which is screwed into nipple 13 or otherwise removably secured thereto. The pipe 17 has a valve 18 above the point of connection with pipe 12, which may be permanently or separably connected with pipe 17. In fact, the parts 12, 16 and 17 may be a unitary attachment for tank 10.

The receptacle 16 is adapted to contain coloring matter, either liquid or powdered, and preferably an organic dyestuff is used, such as aniline dyes, which are generally harmless. A pipe 19 connects the dye container 16 with a source of liquid or gaseous carbon dioxide under pressure, and this connection is controlled by a valve 20 or otherwise. A removable gas-tight cover 21 permits access to receptacle 16 for replenishing the same.

The dyestuff is injected into tank 10 either before or after the latter is filled with liquid carbon dioxide. If the tank is first to be filled, the valve 17 is closed and valves 14 and 15 are opened. When the tank is full, valve 15 is closed and valves 18 and 20 are opened, whereby the pressure of carbon dioxide in pipe 19 forces a quantity of dyestuff from receptacle 16 into tank 10. It is assumed, of course, that the pressure in pipe 19 is greater than that in tank 10. The injected dyestuff, whether powdered or liquid, is uniformly distributed or suspended in the liquid carbon dioxide. Therefore, when the contents of tank 10 are subsequently released, the solidified carbon dioxide is uniformly colored throughout its mass, and the color may be said to form a structural part of this product.

The dyestuff may also be introduced into tank 10 when it is empty, and in that case it is only necessary to open valves 14 and 18, so that the color drops by gravity into the tank. Further, it is possible to color carbon dioxide in gaseous condition by mixing powdered dyestuffs therewith. Thus, when gaseous carbon dioxide is forced under pressure through receptacle 16, it carries a quantity of powdered dyestuff into the empty tank 10 or other container through which the gas passes or in which it is stored for subsequent liquefaction.

I claim as my invention:

1. In the process of producing artificially colored carbon dioxide ice, the steps which consist in utilizing carbon dioxide under pressure to inject coloring matter into a mass of unsolidified carbon dioxide, and subsequently solidifying said mass of colored carbon dioxide.

2. In the process of producing artificially colored carbon dioxide ice, the steps which consist in utilizing carbon dioxide under pressure to inject coloring matter into a mass of liquid carbon dioxide held under pressure independently of said first-mentioned carbon dioxide, and subsequently solidifying said mass of colored carbon dioxide.

3. Apparatus for coloring carbon dioxide ice comprising a tank adapted to receive liquid carbon dioxide under pressure, a receptacle connected with said tank and containing coloring material, and means for connecting said receptacle with a source of carbon dioxide gas under sufficient pressure to force said coloring material into the tank.

4. In the process of producing artificially colored carbon dioxide ice, the steps which consist in utilizing gaseous means to inject coloring matter into a closed receptacle containing carbon dioxide in non-solidified state, and subsequently solidifying said mixture of color and carbon dioxide.

PETER SCHLUMBOHM.